US012724809B2

(12) United States Patent
Bradt et al.

(10) Patent No.: US 12,724,809 B2
(45) Date of Patent: Sep. 1, 2026

(54) STORING USER-DEFINED QUERY LOGIC IN A DATABASE FOR FILTERING ENTITY DATA

(71) Applicant: Klaviyo, Inc, Boston, MA (US)

(72) Inventors: Joshua Bradt, Cambridge, MA (US); Anton Rodionov, The Hague (NL)

(73) Assignee: Klaviyo, Inc., Boston, MA (US)

( * ) Notice: Subject to any disclaimer, the term of this patent is extended or adjusted under 35 U.S.C. 154(b) by 0 days.

(21) Appl. No.: 18/526,131

(22) Filed: Dec. 1, 2023

(65) Prior Publication Data

US 2025/0181624 A1 Jun. 5, 2025

(51) Int. Cl.
*G06F 16/335* (2019.01)

(52) U.S. Cl.
CPC .................................. *G06F 16/335* (2019.01)

(58) Field of Classification Search
CPC ..................................................... G06F 16/335
See application file for complete search history.

(56) References Cited

U.S. PATENT DOCUMENTS 6,424,997 B1 7/2002 Buskirk, Jr. et al.
7,120,629 B1 * 10/2006 Seibel .................. G06F 16/951 707/999.005
7,765,222 B2 7/2010 Styles et al.
7,991,800 B2 8/2011 Lawrence et al.
8,200,612 B2 6/2012 Soylemez et al.
8,463,736 B2 6/2013 Bakalash et al.
8,751,327 B2 6/2014 Park et al.
8,886,617 B2 11/2014 Grondin et al.
9,350,867 B2 5/2016 Ristock et al.
9,390,115 B2 7/2016 Liu et al.
9,501,585 B1 11/2016 Gautam et al.
9,558,238 B2 1/2017 Beutlberger et al.
9,892,420 B2 2/2018 Sterns et al.
10,176,222 B2 1/2019 Schneider et al.

(Continued)

OTHER PUBLICATIONS

Boufenneche, Web Analytics Tools for e-commerce: An Overview and Comparative Analysis, pp. 51-72, (Year: 2022).

(Continued)

*Primary Examiner* — Sherief Badawi
*Assistant Examiner* — J Mitchell Curran
(74) *Attorney, Agent, or Firm* — Brian R. Short

(57) ABSTRACT

Apparatuses, methods, and systems for filtering entities within a database based on rules of a user-defined segment definition. One method includes creating data tables for storing user-defined segment definitions in the database, the data tables including the user-defined segment definitions and criteria, receiving new user-defined segment definitions, transforming the new user-defined segment definitions, storing the transformed new user-defined segment definitions in the database, composing a user-defined query based on the transformed new user-defined segment definitions as stored in the database, wherein the user-defined query contains logic that interprets the filter definition tuples as native operations provided by the database, and running the composed user-defined query against the data tables to determine which of the entities qualify for membership in new segments based on each of the new user-defined segment definitions as determined by the logic contained in the composed user-defined query.

20 Claims, 6 Drawing Sheets

(56) References Cited

U.S. PATENT DOCUMENTS

| | | | | |
|---|---|---|---|---|
| 10,614,501 | B2 | 4/2020 | Fredrich et al. | |
| 10,657,134 | B2 | 5/2020 | Gadodia et al. | |
| 10,713,230 | B2 | 7/2020 | Weissman et al. | |
| 10,728,200 | B2 | 7/2020 | Miller et al. | |
| 11,070,511 | B2 | 7/2021 | O'Brien et al. | |
| 11,144,198 | B2 | 10/2021 | Chen et al. | |
| 11,144,980 | B2 | 10/2021 | Fredrich et al. | |
| 11,176,533 | B2 | 11/2021 | Maxwell et al. | |
| 11,250,055 | B2 | 2/2022 | Micucci et al. | |
| 11,265,271 | B2 | 3/2022 | Tetreault et al. | |
| 11,315,132 | B2 | 4/2022 | Ganti et al. | |
| 11,562,095 | B2 * | 1/2023 | Diamant | G06F 21/602 |
| 2005/0209997 | A1 | 9/2005 | Haas et al. | |
| 2007/0112717 | A1 * | 5/2007 | Serrano-Morales | G06N 5/02 706/47 |
| 2007/0112827 | A1 | 5/2007 | Dettinger et al. | |
| 2007/0219943 | A1 | 9/2007 | Draughn | |
| 2009/0089240 | A1 * | 4/2009 | Winter | G06F 16/283 707/999.1 |
| 2009/0182718 | A1 * | 7/2009 | Waclawik | G06F 16/335 707/E17.046 |
| 2010/0088344 | A1 * | 4/2010 | Treat | G06F 16/9535 707/E17.014 |
| 2013/0055118 | A1 | 2/2013 | Donovan et al. | |
| 2013/0132326 | A1 | 5/2013 | Demuth et al. | |
| 2016/0241502 | A1 | 8/2016 | Georgiou | |
| 2019/0043106 | A1 | 2/2019 | Talmor et al. | |
| 2020/0013092 | A1 | 1/2020 | Liu et al. | |
| 2021/0019125 | A1 * | 1/2021 | Shi | G06N 3/092 |
| 2022/0284013 | A1 | 9/2022 | Panuganty et al. | |
| 2024/0220513 | A1 | 7/2024 | Batanov, III et al. | |
| 2025/0181589 | A1 | 6/2025 | McGrath et al. | |
| 2025/0181624 | A1 | 6/2025 | Bradt et al. | |
| 2026/0064694 | A1 | 3/2026 | Pena et al. | |

OTHER PUBLICATIONS

Simon, Customer segmentation: Definition, benefits, & methods, pp. 1-10, Mar. 7, 2024.

Viana, 5 Ways AI can take your emails to the next level, pp. 1-15, Jun. 4, 2024.

* cited by examiner

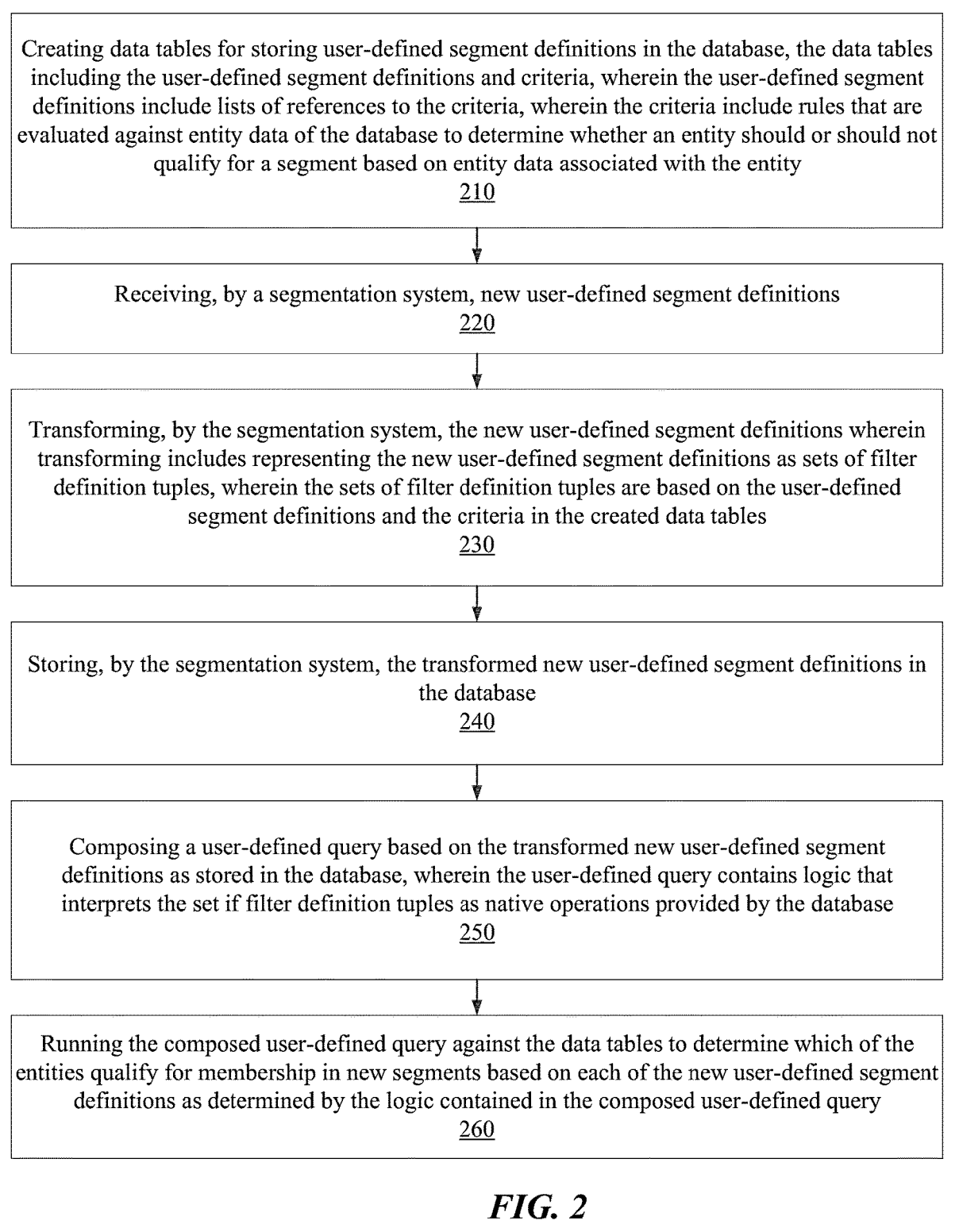

Creating data tables for storing user-defined segment definitions in the database, the data tables including the user-defined segment definitions and criteria, wherein the user-defined segment definitions include lists of references to the criteria, wherein the criteria include rules that are evaluated against entity data of the database to determine whether an entity should or should not qualify for a segment based on entity data associated with the entity
210

Receiving, by a segmentation system, new user-defined segment definitions
220

Transforming, by the segmentation system, the new user-defined segment definitions wherein transforming includes representing the new user-defined segment definitions as sets of filter definition tuples, wherein the sets of filter definition tuples are based on the user-defined segment definitions and the criteria in the created data tables
230

Storing, by the segmentation system, the transformed new user-defined segment definitions in the database
240

Composing a user-defined query based on the transformed new user-defined segment definitions as stored in the database, wherein the user-defined query contains logic that interprets the set if filter definition tuples as native operations provided by the database
250

Running the composed user-defined query against the data tables to determine which of the entities qualify for membership in new segments based on each of the new user-defined segment definitions as determined by the logic contained in the composed user-defined query
260

*FIG. 2*

Events: (Profile Data) 310

| metric | profile_id | event_id | event_value | timestamp | properties |
|---|---|---|---|---|---|
| Placed Order | profile_0 | 0 | 15.86 | 1672509828 | {"Items": ["shoes", "belt"]} |
| Opened Email | profile_1 | 1 | 0 | 1672509828 | {"domain": "example.com"} |

Traits: (Profile Data) 320

| type | profile_id | properties |
|---|---|---|
| property | profile_0 | {"email": "abc@example.com", "Interests": ["baking", "hiking"]} |

*FIG. 3*

Segment definitions: (User-defined segment definitions) 410

| segment_id | stanza_ids |
| --- | --- |
| xyz123 | [0, 1] |
| abc456 | [2] |

Stanza definitions: (User-defined segment definitions) 420

Criteria are combined like this:
*Segment: has within it several stanzas,
*Stanza has criteria within it
*Criteria in stanza combined with OR
*Results for each stanza combined with AND

| stanza_id | event_criterion_ids | property_criterion_ids |
| --- | --- | --- |
| 0 | [0] | [] |
| 1 | [1, 2] | [0, 1, 2] |
| 2 | [] | [3, 4] |

*FIG. 4*

Event criterion definitions: (User-defined segment definitions / criteria) 510

| criterion_id | metric | time_filters | property_filters | count_filters | value_filters |
|---|---|---|---|---|---|
| 0 | Placed Order | [('in-the-last', '7$$d')] | [('SKU', 'eq', '012345')] | [('gt', '0')] | [] |
| 1 | Opened Email | [] | [] | [('eq', '0')] | [] |
| 2 | Placed Order | [('after', '2023-01-01 00:00:00')] | [('Items', 'contains-any-of', '["shirt", "shoes"]')] | [] | [('gte', '10.99')] |

Property criterion definitions: (User-defined segment definitions / criteria) 520

| criterion_id | property_name | filters |
|---|---|---|
| 0 | Email | [('text', 'ends-with', 'example.com'), ('text', 'starts-with', 'a')] |
| 1 | Birthday | [('date', 'anniversary-in-the-next', '4$$d')] |
| 2 | Loyalty points balance | [('numeric', 'gt', '150'), ('numeric', 'lt', '3000')] |
| 3 | Interests | [('list', 'length-gt', '4'), ('list', 'contains', 'hiking')] |
| 4 | Is Subscriber | [('boolean', 'eq-true', '')] |

*FIG. 5*

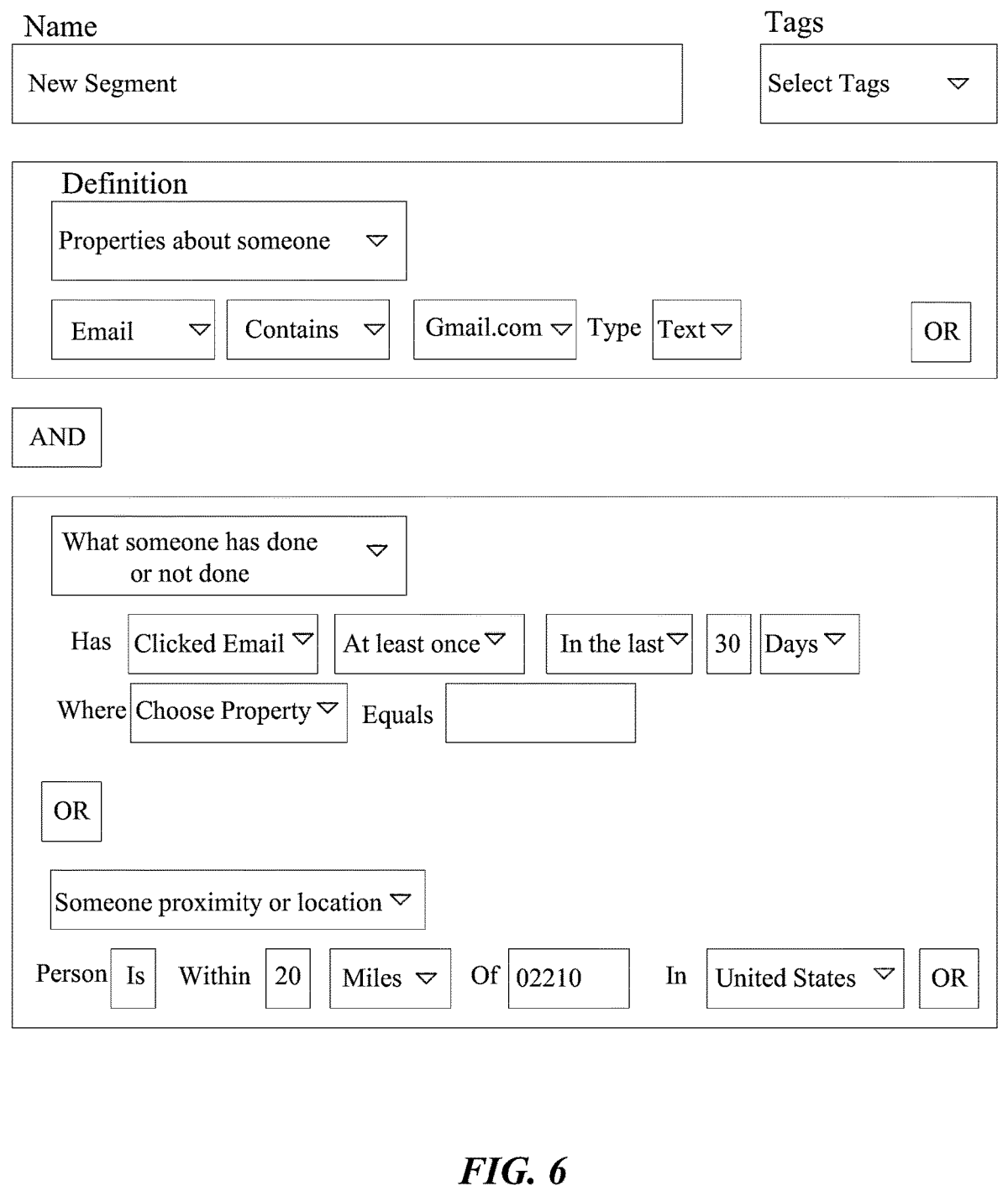

Name

New Segment

Tags

Select Tags

Definition

Properties about someone

Email Contains Gmail.com Type Text OR

AND

What someone has done or not done

Has Clicked Email At least once In the last 30 Days

Where Choose Property Equals

OR

Someone proximity or location

Person Is Within 20 Miles Of 02210 In United States OR

FIG. 6

STORING USER-DEFINED QUERY LOGIC IN A DATABASE FOR FILTERING ENTITY DATA

FIELD OF THE DESCRIBED EMBODIMENTS

The described embodiments relate generally to filtering of data. More particularly, the described embodiments relate to systems, methods, and apparatuses for storing user-defined query logic in a database for filtering entity data.

BACKGROUND

Data Segmentation is the process of taking data and dividing it up and grouping similar data together based on chosen parameters. For example, a shoe company might segment its database to show which customers purchase tennis shoes the most versus which customers purchase dress shoes. An office supply store might segment its business buyers into categories such as "furniture buyers," "paper buyers" and "printer ink buyers."

It is desirable to have methods, apparatuses, and systems for storing user-defined query logic in a database for filtering entity data.

SUMMARY

An embodiment includes a computer-implemented method for filtering entities within a database based on rules of a user-defined segment definition applied to various data points associated with each entity stored in the database, including creating data tables for storing user-defined segment definitions in the database, the data tables including the user-defined segment definitions and criteria, wherein the criteria include rules that are evaluated against entity data of the database to determine whether an entity should or should not qualify for a segment based on entity data associated with the entity, receiving, by a segmentation system, new user-defined segment definitions, transforming, by the segmentation system, the new user-defined segment definitions, wherein transforming includes representing the new user-defined segment definitions as sets of filter definition tuples, wherein the sets of filter definition tuples are based on the user-defined segment definitions and the criteria in the created data tables, storing, by the segmentation system, the transformed new user-defined segment definitions in the database, composing a user-defined query based on the transformed new user-defined segment definitions as stored in the database, wherein the user-defined query contains logic that interprets the sets of filter definition tuples as native operations provided by the database, and running the composed user-defined query against the data tables to determine which of the entities qualify for membership in new segments based on each of the new user-defined segment definitions as determined by the logic contained in the composed user-defined query.

Another embodiment includes a system for filtering entities based on rules of a user-defined segment definition. The system includes a server, a database, wherein entities are stored in the database, a user server electronically connected to the server, and sub-user computing devices electronically connected to the server and the user server, wherein the entity data includes data of sub-users of the sub-user computing devices. The server is configured to create data tables for storing user-defined segment definitions in the database, the data tables including the user-defined segment definitions and criteria, wherein the criteria include rules that are evaluated against entity data of the database to determine whether an entity should or should not qualify for a segment based on entity data associated with the entity, receive new user-defined segment definitions from a user of the user server, transform the new user-defined segment definitions, wherein transforming includes representing the new user-defined segment definitions as sets of filter definition tuples, wherein the sets of filter definition tuples are based on the user-defined segment definitions and the criteria in the created data tables, store the transformed new user-defined segment definitions in the database, compose a user-defined query based on the transformed new user-defined segment definitions as stored in the database, wherein the user-defined query contains logic that interprets the sets of filter definition tuples as native operations provided by the database, and run the composed user-defined query against the data tables to determine which of the entities qualify for membership in new segments based on each of the new user-defined segment definitions as determined by the logic contained in the composed user-defined query.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 2 is a flow chart that includes steps of a method for storing user-defined query logic in a database for filtering entity data, according to an embodiment.

FIG. 3 shows tables of profile data, according to an embodiment.

FIG. 4 shows tables of user-defined segment definitions, according to an embodiment.

FIG. 5 shows additional tables of user-defined segment definitions, according to an embodiment.

FIG. 6 shows a user interface of a system for storing user-defined query logic in a database for filtering entity data, according to an embodiment.

DETAILED DESCRIPTION

Figure 1:
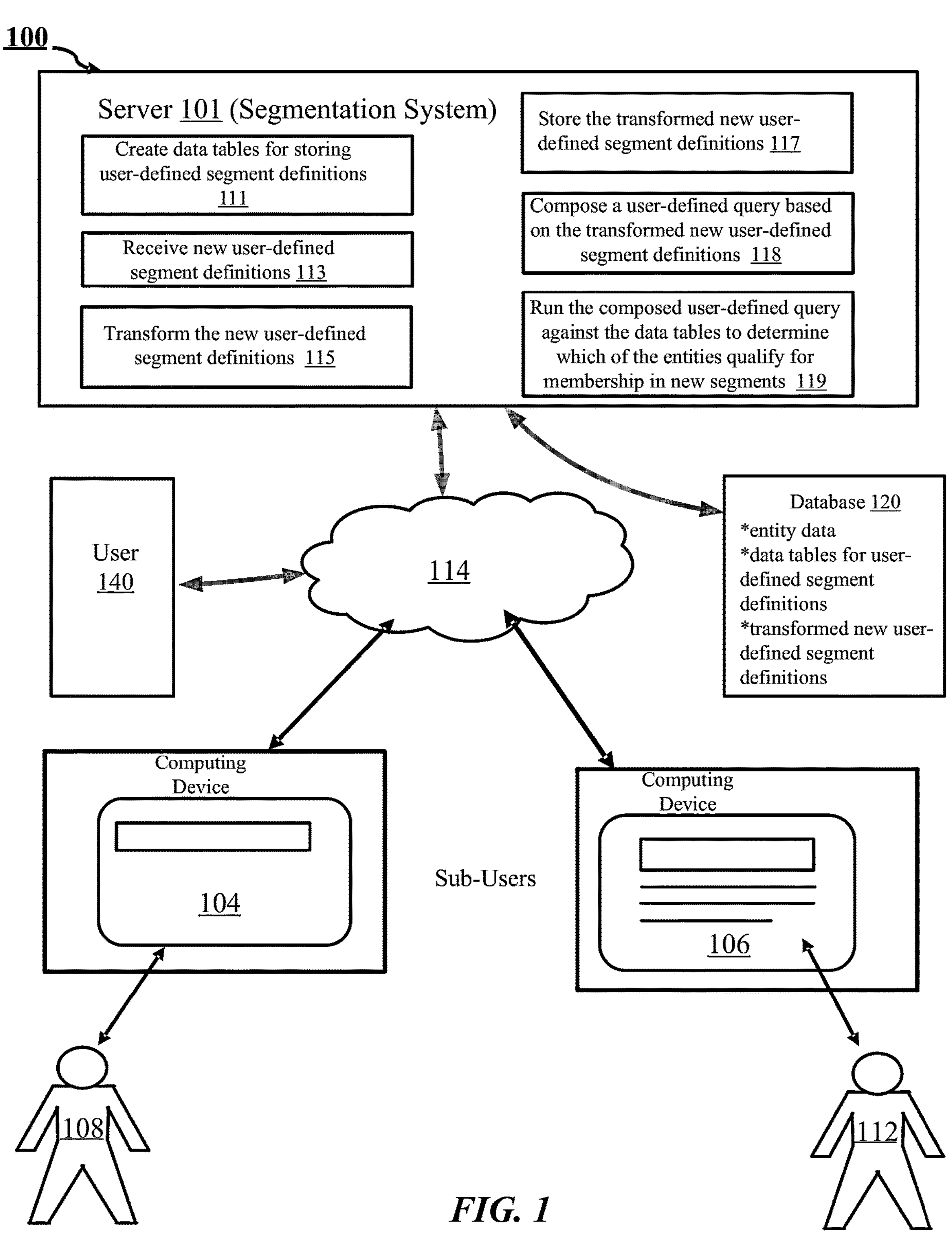
FIG. 1 shows a system for storing user-defined query logic in a database for filtering entity data, according to an embodiment.

The embodiments described include methods, apparatuses, and systems for storing user-defined query logic in a database for filtering entity data. For an embodiment, this includes storing the transformed new user-defined segment definitions in the database, composing a user-defined query based on the transformed new user-defined segment definitions as stored in the database, and running the composed user-defined query against data tables to determine which of the entities qualify for membership in new segments based on each of the new user-defined segment definitions as determined by the logic contained in the composed user-defined query. An electronic action (such as sending an electronic message) is performed directed to sub-users identified by membership in the new segments.

Typically, segments are based on user-defined sets of rules for filtering data in a database. If the data is stored in a single analytical database, then a natural solution is to write SQL (structured query language) queries to calculate segment memberships based on this data. It is desirable to express the user-defined rule sets in the SQL queries. Structured query language (SQL) is a programming language for storing and processing information in a relational database. A relational database stores information in tabular form, with rows and columns representing different data attributes and the various relationships between the data values. SQL statements can be used to store, update, remove, search, and retrieve information from the database. SQL can also be used to maintain and optimize database performance.

One way to do this is to build the query string in code based on a list of rules of a user. However, building a syntactically correct SQL query this way is difficult and error-prone, and is also vulnerable to SQL injection attacks if the user-provided strings are not properly sanitized to remove malicious inputs. This method is also not practical if the user wants to run more than one segment simultaneously, which is required when keeping segments up to date in real time.

At least some of the described embodiments include storing a rule set (transformed new user-defined segment definitions) of the user in the database making the query itself generic. Therefore, any number of segments can be evaluated simultaneously in one SQL query, and the system is protected from SQL injection attacks since the query is not being pieced together from user-provided strings. That is, at least some of the described embodiments provide a technical solution to the technical problem of evaluating multiple segments simultaneously in a single query (for example, a single SQL query). Further, the operation of the computer or processor performing at least some of the described embodiments is improved by reducing the possibilities of SQL injection attacks when performing an SQL query of the database in which data being segmented is stored. SQL injection (SQLi) is a web security vulnerability that allows an attacker to interfere with the queries that an application makes to its database. This can allow an attacker to view data that they are not normally able to retrieve. This might include data that belongs to other users, or any other data that the application can access. In many cases, an attacker can modify or delete this data, causing persistent changes to the application's content or behavior.

FIG. 1 shows a system 100 for storing user-defined query logic in a database for filtering entity data, according to an embodiment. As shown, for an embodiment, the system includes a segmentation server 101 and an associated database 120. For an embodiment, the segmentation server 101 is electronically connected through a network (for example, the internet) 114 to user server 140 of a user, and to computing devices 104, 106 of sub-users 108, 112. For an embodiment, the user is a merchant, and the sub-users are customers of the merchant. For an embodiment, one or more of the entities include a profile of the sub-users (customers) of the user (merchant) 108, 112, which can be added to the database 120 through means including integrations with third-party platforms (including ecommerce providers or external customer data platforms, for example), API calls from the user's own computer systems, websites, or mobile apps, or user-initiated file uploads to the server 101. For other embodiments, one or more of the entities may include entries in a user's catalog of items for sale; user-defined custom entities such as restaurant reservations, gift cards, or event tickets; or coupon codes and associated metadata. For an embodiment, the profiles of the entities come from another platform that customers of an operator of the server integrate into their system. For example, an ecommerce provider like Shopify®, a third-party point-of-sale system in a brick-and-mortar store, or a third-party customer data platform (CDP). They can also be created by uploading files of profile data to an application or by API calls to the application (for example, from a user's own mobile application or their website).

For an embodiment, the user of the user server 140 may initiate a segmentation process of information related to the sub-users. For example, the user may desire segmentation of email addresses of the sub-users for facilitating targeted emailing of advertising. For an embodiment, a profile of each of the sub-users is stored in the database. For an embodiment, the segmentation includes analyzing information within the profiles of the sub-users to filter the sub-users based on a user-provided criteria, which can include criteria like "profiles located in New York," "profiles that have purchased at least 2 pairs of red pants in the last 6 months," or "profiles whose pre-computed probability of placing an order in the next 30 days is greater than 50%" or combinations of criteria such as these.

For an embodiment, the server 101 is configured to filter entities (for an embodiment, the entities each include the previously mentioned profiles) within the database 120 based on rules of a user-defined segment definition applied to various data points associated with each entity stored in the database. For an embodiment, this includes the server 101 operating to create 111 data tables for storing user-defined segment definitions in the database, the data tables including the user-defined segment definitions and criteria, wherein the user-defined segment definitions include lists of references to the criteria, wherein the criteria include rules that are evaluated against entity data of the database to determine whether an entity should or should not qualify for a segment based on entity data associated with the entity. For an embodiment, the results of the criteria are logically aggregated using Boolean operators (AND or OR).

For an embodiment, the server 101 further operates to receive 113 new user-defined segment definitions. For an embodiment, the new user-defined segment definition is received by the server 101 from the user server 140 of the user for the purpose of generating a new segmentation process.

For an embodiment, the server 101 further operates to transform 115 the new user-defined segment definitions, wherein transforming includes representing the new user-defined segment definitions as sets of filter definition tuples, wherein the sets of filter definition tuples are based on the user-defined segment definitions and the criteria in the created data tables. For an embodiment, each of the criteria includes a definition that is a list of generic filter definition tuples. For an embodiment, the sets of filter definition tuples include conditions that must be met by a given event or trait (of the entities) for the entity (profile) to qualify for the criteria. There are a few variations in the filter tuple schema, but for an embodiment, the sets of filter definition tuples are of the form (key, operator, value) or (type, key, operator, value). An exemplary filter may include "('some_property', 'eq', 1234)" which is conceptually similar to an SQL "where" clause like "where some_property=1234". The type field may be included to allow properties to be treated as or cast to different types at query time, which is important since an operator of the server 101 may not enforce a rigid, typed schema on customer-provided data.

For an embodiment, each filter tuple column is of an array type. When multiple filter tuples are present, they must all be satisfied together. That is, the filter tuples are combined with an AND Boolean operator.

While described as sets of filter definition tuples, at least one embodiment includes replacing the sets of filter definition tuples with a separate table with a row for each member of the set of filter definition tuples and a column for each field in each the set of filter definition tuples, which can be joined to the remaining parts of the user-defined segment definition.

For an embodiment, the server 101 further operates to store 117 the transformed new user-defined segment definitions in the database. As previously described, at least some of the described embodiments include storing a rule set of the user (that is, the transformed new user-defined segment definitions) in the database making the query itself generic. That way, any number of segments can be evaluated simultaneously in one SQL query, and the system is protected from SQL injection attacks since the query is not being pieced together from user-provided strings. That is, at least some of the described embodiments provide a technical solution to the technical problem of evaluating multiple segments simultaneously in a single query (for example, a single SQL query). Further, the operation of the computer or processor performing at least some of the described embodiments is improved by reducing the possibilities of SQL injection attacks when performing an SQL query of the database in which data being segmented is stored.

For an embodiment, the server 101 further operates to compose 118 a user-defined query based on the transformed new user-defined segment definitions as stored in the database, wherein the user-defined query contains logic that interprets the sets of filter definition tuples and performs the SQL operation or function call that is represented by each filter tuple of the sets of filter definition tuples. For example, a filter tuple "('price', 'gt', '50')" may be interpreted as a SQL condition "WHERE price >50", or a filter tuple "('email', 'ends-with', 'example.com')" may be interpreted as a SQL condition "WHERE endsWith (email, 'example-.com')" (assuming the database provides a built-in function "endsWith" for this purpose). This enables calls to functions to be built into the SQL implementation provided by the database. Another way of saying this is that this is where the filter tuples become standard SQL, but in a way that is not prone to SQL injection attacks.

For an embodiment, the server 101 further operates to run 119 the composed user-defined query against the data tables to determine which of the entities qualify for membership in new segments based on each of the new user-defined segment definitions as determined by the logic contained in the composed user-defined query. For an embodiment, the operation of running the composed user-defined query consists of running a predefined SQL query that combines the criteria to evaluate from the criterion tables with the data from the entity data tables to determine which entities qualify for membership in the segment. As previously described, the sets of filter definition tuples are based on the user-defined segment definitions and the criteria in the created data tables.

For an embodiment, the segmentation process includes implementing filters using user-defined SQL functions in an analytical database. These are essentially large if/else trees with a case for each operator, where the operators include simple things like "eq" (equals), "gt" (greater than), or "contains", but also more complex things like conditions on time relative to now ("in-the-last", "anniversary-in-the-next").

For an embodiment, at query time (running the composed user-defined query), segment definitions are used to filter entity (profile) data and event histories to decide if profiles belong in the segments. In general, many segments are evaluated simultaneously. For an embodiment, desired definitions from the tables described are selected, and these definitions are joined to pre-filtered subsets of the event and trait data tables in the analytical database. An embodiment includes pre-filtering to select only the subset of data that is relevant for the set of segments being evaluated.

For an embodiment, for event data, each event is filtered first on its properties by iterating over each property filter tuple, evaluating it using the filtering functions, and combining the results with an AND. Events that don't satisfy the filter are removed from consideration. The remaining events are then grouped by the entity they are related to, and the event count and total event value are aggregated, where the event value corresponds to things like the price of purchased items. Filters on the event count or total event value are then applied to these aggregates, and this determines whether or not an entity (profile) qualifies for this event criterion. As previously described, the profile may be of one of the sub-users of the user.

For an embodiment, a similar procedure is followed as trait criteria as the property criterion. The trait data is loaded, and the properties associated with that trait are filtered like the event properties were filtered above. For an embodiment, the difference is that there is only one trait row for each profile and trait type, so there's no aggregation involved. If the trait row passes the combined property filters, then the profile qualifies for this criterion. Finally, criterion results are combined to give the overall segment results.

For an embodiment, the entity or entities include something that the data in the data tables is associated with, and which can qualify for membership in a segment based on the user-defined segment definition. As described, for an embodiment, each entity is a profile. However, for at least some other embodiment, an entity may include catalog items sold by an ecommerce store, or user-defined objects representing things like concert tickets, coupons, or appointment bookings.

For at least some embodiments, segments or a segment include a list of entities whose membership is determined by evaluating the composed user-defined query based on the user-defined segment definition.

For at least some embodiments, the user-defined segment definitions include a collection of rules determining the membership of a segment, where the rules can be transformed into sets of filter definition tuples.

For an embodiment, the data points associated with each profile/entity include profile activity history (recorded events for things like receiving an email, placing an order, viewing a product on the customer's website, etc., including user-defined custom event types). For an embodiment, the data points associated with each profile/entity include attributes specific to the profile (called profile "traits"), including, for example, the profile's contact information (email, phone number, push notification tokens, etc.), location data (mailing addresses, IP addresses, locations derived from IP addresses, time zone, etc.), consent to receive marketing communications, memberships in certain mailing lists, other values derived from machine learning algorithms, etc.

For an embodiment, data points for other types of entity are different, but have a similar structure. For example, entities representing catalog items might have traits for the inventory of that item in stock and attributes about the item like its size or color, and the events for these catalog item entities might include changes in inventory level.

For an embodiment, the data tables are tables in a database that contain the event and trait data associated with each entity, or the user-defined segment definitions (after the transformation), or the criteria that make up the definition.

For an embodiment, this includes, for example, a criterion based on the entity's event history and a criterion based on properties about the entity.

For an embodiment, the criteria include rules that are evaluated as part of a user-defined segment definition. For at least some embodiments, the rules include one or more of a profile's email address ends with "example.com", a profile's phone number is not blank, a profile has given consent to receive SMS marketing messages, a profile has placed orders in the last 6 months whose total revenue is greater than $1000, a profile has ordered a product with the category "Pants" at least 4 times between Mar. 1, 2023, and Aug. 6, 2023, a profile's location is within 10 miles of the postal code 12345 in the United States.

A previously described, for an embodiment, each entity includes a profile. For an embodiment, a profile represents a person (sub-user) who the user can communicate with or collect information about. For example, if the user runs an ecommerce store, the profile represents a single customer (sub-user) of that store.

For an embodiment, lists of references to the criteria include lists of the IDs of criteria, where each ID is an arbitrary and unique value that can be used to unambiguously refer to a single criterion.

For an embodiment, a set of filter definition tuples include a set of transformed representations of the criteria. These map directly to operations that the database knows how to perform. For example:

Criterion: Profile's email address ends with "example.com"
  Tuple: ("email", "ends-with", "example.com")
    DB operation (psuedocode): WHERE endsWith (email, "example.com")
Criterion: Profile has ordered a product with the category "Pants" at least 4 times between Mar. 1, 2023, and Aug. 6, 2023.
  Tuple: ("Category", "eq", "Pants")
    DB operation: WHERE Category="Pants"
  Other tuple (very roughly): ("count", "gte", 4)
    DB operation: HAVING count ( )>=4

For an embodiment, logic that implements the sets of filter definition tuples as calls to functions implemented by the database.

For at least some embodiments, the user-defined segment definitions include the criteria and rules for combining the results of these criteria with Boolean operations AND and OR. For an embodiment, the composed user-defined query aggregates the results by entity and user-defined segment to find all entities that qualify for the user-defined segment based on the rules from the segment definition for combining the results of the criteria. For example, this may include grouping together some criteria with a Boolean OR operation, and then combine the result of this with other criteria using a Boolean AND operation.

FIG. 2 is a flow chart that includes steps of a method for storing user-defined query logic in a database for filtering entity data, according to an embodiment. A first step 210 includes creating data tables for storing user-defined segment definitions in the database, the data tables including the user-defined segment definitions and criteria, wherein the criteria include rules that are evaluated against entity data of the database to determine whether an entity should or should not qualify for a segment based on entity data associated with the entity. For an embodiment, the user-defined segment definitions include lists of references to the criteria and operators. For an embodiment, the operators include, for example, "equals", "greater than", or "less than." For an embodiment, the criteria include sets of (attribute name, operator, value), such as, (email, equals, "something@something.com"). A second step 220 includes receiving, by a segmentation system, new user-defined segment definitions. A third step 230 includes transforming, by the segmentation system, the new user-defined segment definitions, wherein transforming includes representing the new user-defined segment definitions as sets of filter definition tuples, wherein the sets of filter definition tuples are based on the user-defined segment definitions and the criteria in the created data tables. A fourth step 240 includes storing, by the segmentation system, the transformed new user-defined segment definitions in the database. A fifth step 250 includes composing a user-defined query based on the transformed new user-defined segment definitions as stored in the database, wherein the user-defined query contains logic that interprets the sets of filter definition tuples as native operations provided by the database. For an embodiment, native operations include operations built into the database as opposed to being separately defined. A sixth step 260 includes running the composed user-defined query against the data tables to determine which of the entities qualify for membership in new segments based on each of the new user-defined segment definitions as determined by the logic contained in the composed user-defined query. For an embodiment, the segmentation of the entities provides a filtered set of entities per the new user-defined segment definitions.

As previously described, while described as sets of filter definition tuples, at least one embodiment includes replacing the sets of filter definition tuples with a separate table with a row for each member of the set of filter definition tuples and a column for each field in each the set of filter definition tuples, which can be joined to the remaining parts of the user-defined segment definition.

Transforming New User-Defined Segment Definitions

As previously stated, an embodiment includes transforming, by the segmentation system, the new user-defined segment definitions, wherein transforming includes representing the new user-defined segment definitions as sets of filter definition tuples, wherein the sets of filter definition tuples are based on the user-defined segment definitions and the criteria in the created data tables. As previously described, for an embodiment, each of the criteria includes a definition that is a list of generic filter definition tuples. For an embodiment, the sets of filter definition tuples include conditions that must be met by a given event or trait (of the entities) for the entity (profile) to qualify for the criteria. There are a few variations in the filter tuple schema, but for an embodiment, the sets of filter definition tuples are of the form (key, operator, value) or (type, key, operator, value). An exemplary filter may include "('some_property', 'eq', 1234)" which is conceptually similar to an SQL "where" clause like "where some_property=1234". The type field may be included to allow properties to be treated as or cast to different types at query time, which is important since an operator of the server 101 may not enforce a rigid, typed schema on customer-provided data. For an embodiment, events are actions that a profile has taken, like placing an order, receiving an email, and/or opening an SMS message.

Composing the User-Defined Query

As previously stated, an embodiment includes composing a user-defined query based on the transformed new user-defined segment definitions as stored in the database, wherein the user-defined query contains logic that interprets the sets of filter definition tuples as native operations provided by the database. For an embodiment, native operations include operations built into the database as opposed to being separately defined. Further, as previously described, for an embodiment, the user-defined query contains logic that interprets the sets of filter definition tuples and performs the SQL operation or function call that is represented by each filter tuple of the sets of filter definition tuples. For example, a filter tuple "('price', 'gt', '50')" may be interpreted as a SQL condition "WHERE price >50", or a filter tuple "('email', 'ends-with', 'example.com')" may be interpreted as a SQL condition "WHERE endsWith (email, 'example.com')" (assuming the database provides a built-in function "endsWith" for this purpose). This enables calls to functions to be built into the SQL implementation provided by the database. Another way of saying this is that this is where the filter tuples become standard SQL, but in a way that is not prone to SQL injection attacks.

Running the Composed User-Defined Query

As previously stated, an embodiment includes running the composed user-defined query against the data tables to determine which of the entities qualify for membership in new segments based on each of the new user-defined segment definitions as determined by the logic contained in the composed user-defined query. As previously described, for an embodiment, the operation of running the composed user-defined query consists of running a predefined SQL query that combines the criteria to evaluate from the criterion tables with the data from the entity data tables to determine which entities qualify for membership in the segment. As previously described, the sets of filter definition tuples are based on the user-defined segment definitions and the criteria in the created data tables. Structured query language (SQL) is a programming language for storing and processing information in a relational database. A relational database stores information in tabular form, with rows and columns representing different data attributes and the various relationships between the data values. SQL statements can be used to store, update, remove, search, and retrieve information from the database. SQL can also be used to maintain and optimize database performance. For an embodiment, the database query (such as the composed user-defined query) is a request for data from the database. The request comes in a database table or a combination of tables using a code know as the query language. This way, the database can understand and process the query accordingly.

As least some embodiments further include electronically performing an action directed to sub-users identified by membership in the new segments. For an embodiment, the action includes electronically messaging sub-users the were filtered by the composed user-defined query. For at least some embodiments, the segments are created to target marketing email and/or SMS messages to a group of people based on the conditions in the segment definition.

For an embodiment, each of the entities comprises a profile, wherein each profile represents a person (sub-user) that the user can communicate with or collect information about. For example, if the user runs an ecommerce store, the profile represents a single customer (sub-user) of that store.

For an embodiment, each segment includes a list of entities, wherein membership of each of the entities is determined by the composed user-defined query based on the new user-defined segment definitions. For an embodiment, one or more of the entities include a profile of the sub-users (customers) of the user (merchant), which can be added to the database through means including integrations with third-party platforms (including ecommerce providers or external customer data platforms, for example), API calls from the user's own computer systems, websites, or mobile apps, or user-initiated file uploads to the server. For other embodiments, one or more of the entities may include entries in a user's catalog of items for sale; user-defined custom entities such as restaurant reservations, gift cards, or event tickets; or coupon codes and associated metadata. For an embodiment, the profiles of the entities come from another platform that customers of an operator of the server integrate into their system. For example, an ecommerce provider like Shopify®, a third-party point-of-sale system in a brick-and-mortar store, or a third-party customer data platform (CDP). They can also be created by uploading files of profile data to an application or by API calls to the application (for example, from a user's own mobile application or their website).

For at least some embodiments, running the composed user-defined query provides for filtering for multiple segments simultaneously. This is possible because the transformed new user-defined segment definitions are stored in the database and read at query time. For an embodiment, the query is written to interpret these filter definition tuples (rules) stored in the database and executes them as standard SQL/Database functions. For an embodiment, the query knows how to interpret the text (tuples) stored in the database and execute them as query logic.

At least some embodiments further include creating and storing a trait and event table in the database as a part of the entity data of the data tables. For an embodiment, the entity data includes an email address of a sub-user. For an embodiment, traits are properties of a profile. This is generally things that profiles have only a few of, and things that are not filtered based on the number of. Traits may include email, phone number, properties, and/or a subscription status.

For an embodiment, the entity data includes time-series data. For an embodiment, the time-series data includes at least one of a purchase history or an email history of a sub-user. For an embodiment, a profile (entity) may have data points that are associated 1:1 with the profile, like an email address or a postal address. However, for an embodiment, the profile may also have time-series data associated with it, including event timelines like purchase history or a history of emails received.

Should we add a claim directed to managing profile data of profiles stored in the database? We could possibly include this in claim 1.

At least some embodiments further include updating the overall segments as entity data changes. For an embodiment, updating the overall segments as entity data changes includes sensing changes in the entity data, and automatically re-running the composed user-defined query against the data tables to determine which of the entities qualify for membership in new segments based on each of the new user-defined segment definitions as determined by the logic contained in the composed user-defined query. For an embodiment, sensing greater than a change threshold of changes to the entity data triggers the updating of the overall segments.

At least some embodiments further include electronically sending messages to sub-users identified by membership in new segments. This may include sending emails, SMS messages, push notifications, or other communications to targeted audiences of people (sub-users).

FIG. 3 shows tables of profile data, according to an embodiment. As previously described, for an embodiment, each entity includes profile data. As shown, for an embodiment, the profile data includes events data 310 which can include a metric, an event_id, an event_value, a timestamp, and properties.

Further, as shown, for an embodiment, the profile data includes traits data 320 which include, for example, a type, a profile_id, and properties.

FIG. 4 shows tables of user-defined segment definitions 410, 420, according to an embodiment. The user-defined segment definitions 410 includes a segment_id and a stanza_id. For an embodiment, the user-defined segment definitions 420 includes a stanza_id, event_criterion_ids, and property_criterion_ids. For an embodiment, these IDs are all randomly chosen values that allow for cross-referencing the stanzas, criteria, and segments and linking them together.

FIG. 5 shows additional tables of user-defined segment definitions, according to an embodiment. Examples of filter tuples are shown between square brackets in the right-most columns of each table. Each filter tuple is enclosed in parentheses.

FIG. 6 shows a user interface of a system for storing user-defined query logic in a database for filtering entity data, according to an embodiment.

Although specific embodiments have been described and illustrated, the embodiments are not to be limited to the specific forms or arrangements of parts so described and illustrated. The described embodiments are to only be limited by the claims.

What is claimed:

1. A method of filtering entities within a database based on rules of a user-defined segment definition applied to various data points associated with each entity stored in the database, comprising: creating data tables for storing user-defined segment definitions in the database, the data tables including the user-defined segment definitions and criteria, wherein the criteria include rules that are evaluated against entity data of the database to determine whether an entity should or should not qualify for a segment based on entity data associated with the entity, wherein the entity data includes data of sub-users of sub-user computing devices and includes at least an email history a of the sub-users;

receiving, by a segmentation system, new user-defined segment definitions;

transforming, by the segmentation system, the new user-defined segment definitions, wherein transforming includes representing the new user-defined segment definitions as sets of filter definition tuples, wherein the sets of filter definition tuples are based on the user-defined segment definitions and the criteria in the created data tables, wherein the sets of filter definition tuples include a field type that allows properties of the sets of filter definition tuples to be cast to different types at query time, thereby allowing an operator of the server to not enforce a rigid typed schema on customer-provided data, wherein the set of filter definition tuples include a set of transformed representations of the criteria that map directly to operations that the database knows how to perform, wherein the set of filter definition tuples are implemented as calls to function implemented by the database;

storing, by the segmentation system, the transformed new user-defined segment definitions in the database, making an SQL query generic, thereby allowing any number of segments to be evaluated simultaneously in one SQL query, and protecting from SQL injection attacks since the generic SQL query in is not pieced together from user-provided strings;

composing a user-defined query based on the transformed new user-defined segment definitions as stored in the database, wherein the user-defined query contains logic that interprets the sets of filter definition tuples as native operations provided by the database, wherein the native operations include operations built into the database as opposed to being separately defined, thereby enabling calls to functions to be built into SQL implementations provided by the database, wherein the logic that interprets the sets of filter definition tuples operates as a standard generic SQL without being prone to SQL injection attacks;

and running the composed user-defined query against the data tables to determine which of the entities qualify for membership in new segments based on each of the new user-defined segment definitions as determined by the logic contained in the composed user-defined query.

2. The method of claim 1, wherein running the composed user-defined query against the data tables provides a filtered set of entities per the new user-defined segment definitions.

3. The method of claim 1, further comprising electronically performing an action directed to users identified by membership in the new segments.

4. The method of claim 1, wherein each of the entities comprises a profile, wherein each profile comprises information of sub-users, wherein the sub-users are customer of the user.

5. The method of claim 1, wherein each segment includes a list of entities, wherein membership of each of the entities is determined by the composed user-defined query based on the new user-defined segment definitions.

6. The method of claim 1, further comprising creating and storing a trait and event table in the database as a part of the entity data of the data tables, wherein the entity data further includes event data and trait criteria, wherein the event data is filtered first on its properties by iterating over each property filter tuple, evaluating the event data using filtering functions, and combining results with an AND, wherein event data that does not satisfy the filtering functions is removed from consideration, and wherein remaining event data is then grouped by an entity they are related to, and wherein trait criteria is loaded, and properties associated with the trait criteria are filtered as the event data is filtered except there is only one trait row for each profile and trait type, thereby not requiring aggregation, wherein when the one trait row passes combined property filters the profile qualifies for the trait criteria.

7. The method of claim 6, wherein the entity data includes an email address of a sub-user.

8. The method of claim 1, wherein the entity data includes time-series data.

9. The method of claim 8, wherein the time-series data includes at least one of a purchase history or an email history of a the sub-user.

10. The method of claim 1, further comprising updating overall segments as entity data changes, comprising: sensing changes in the entity data;

and automatically re-running the composed user-defined query against the data tables to determine which of the entities qualify for membership in new segments based on each of the new user-defined segment definitions as determined by the logic contained in the composed user-defined query.

11. The method of claim 1, further comprising: electronically sending messages to sub-users identified by membership in the new segments.

12. The method of claim 1, wherein the user-defined segment definitions include lists of references to the criteria, wherein the user-defined segment definitions include the criteria and rules for combining the results of the criteria with Boolean operations AND and OR.

13. A system for filtering entities based on rules of a user-defined segment definition, comprising: a server;

a database, wherein entities are stored in the database;

a user server electronically connected to the server;

sub-user computing devices electronically connected to the server and the user server, wherein the entity data includes data of sub-users of the sub-user computing devices; the server configured to:

create data tables for storing user-defined segment definitions in the database, the data tables including the user-defined segment definitions and criteria, wherein the criteria include rules that are evaluated against entity data of the database to determine whether an entity should or should not qualify for a segment based on entity data associated with the entity, wherein the entity data includes data of sub-users of sub-user computing devices and includes at least an email history a of the sub-users;

receive new user-defined segment definitions from a user of the user server; transform the new user-defined segment definitions, wherein transforming includes representing the new user-defined segment definitions as sets of filter definition tuples, wherein the sets of filter definition tuples are based on the user-defined segment definitions and the criteria in the created data tables wherein the sets of filter definition tuples include a field type that allows properties of the sets of filter definition tuples to be cast to different types at query time, thereby allowing an operator of the server to not enforce a rigid typed schema on customer-provided data, wherein the set of filter definition tuples include a set of transformed representations of the criteria that map directly to operations that the database knows how to perform, wherein the set of filter definition tuples are implemented as calls to function implemented by the database;

store the transformed new user-defined segment definitions in the database, making an SQL query generic, thereby allowing any number of segments to be evaluated simultaneously in one SQL query, and protecting from SQL injection attacks since the SQL query in not pieced together from user-provided strings;

compose a user-defined query based on the transformed new user-defined segment definitions as stored in the database, wherein the user-defined query contains logic that interprets the sets of filter definition tuples as native operations provided by the database, wherein the native operations include operations built into the database as opposed to being separately defined, thereby enabling calls to functions to be built into SQL implementations provided by the database, wherein the logic that interprets the sets of filter definition tuples operates as a standard generic SQL without being prone to SQL injection attacks;

and run the composed user-defined query against the data tables to determine which of the entities qualify for membership in new segments based on each of the new user-defined segment definitions as determined by the logic contained in the composed user-defined query.

14. The system of claim 13, wherein the server is further configured to run the composed user-defined query against the data tables to provide a filtered set of entities per the new user-defined segment definitions.

15. The system of claim 13, wherein the server is further configured to electronically perform an action directed to users identified by membership in the new segments.

16. The system of claim 13, wherein running the composed user-defined query provides for filtering for multiple segments simultaneously.

17. The system of claim 13, wherein the entity data includes time-series data, wherein the time-series data further includes at least one of a purchase history or an email history of a sub-user.

18. The system of claim 13, the server updating overall segments as entity data changes, comprises the server being further configured to: sense changes in the entity data;

and automatically re-run the composed user-defined query against the data tables to determine which of the entities qualify for membership in new segments based on each of the new user-defined segment definitions as determined by the logic contained in the composed user-defined query.

19. The system of claim 13, wherein the server is further configured to electronically send messages to sub-users identified by membership in the new segments.

20. The system of claim 13, wherein the server is further configured to: create and store a trait and event table in the database as a part of the entity data of the data tables, wherein the entity data further includes event data and trait criteria, wherein the event data is filtered first on its properties by iterating over each property filter tuple, evaluating the event data using filtering functions, and combining results with an AND, wherein event data that does not satisfy the filtering functions is removed from consideration, and wherein remaining event data is then grouped by an entity they are related to, and wherein trait criteria is loaded, and properties associated with the trait criteria are filtered as the event data is filtered except there is only one trait row for each profile and trait type, thereby not requiring aggregation, wherein when the one trait row passes combined property filters the profile qualifies for the trait criteria.

* * * * *